US012692169B2

(12) United States Patent
Miyoshi et al.

(10) Patent No.: US 12,692,169 B2
(45) Date of Patent: Jul. 28, 2026

(54) HOLLOW INORGANIC PARTICLE AND METHOD FOR PRODUCING SAID HOLLOW INORGANIC PARTICLE

(71) Applicant: UBE EXSYMO CO., LTD., Tokyo (JP)

(72) Inventors: Hidenori Miyoshi, Tokyo (JP); Tatsuya Nakano, Tokyo (JP)

(73) Assignee: UBE EXSYMO CO., LTD., Tokyo (JP)

( * ) Notice: Subject to any disclaimer, the term of this patent is extended or adjusted under 35 U.S.C. 154(b) by 599 days.

(21) Appl. No.: 18/010,994

(22) PCT Filed: May 11, 2021

(86) PCT No.: PCT/JP2021/017889

§ 371 (c)(1),
(2) Date: Dec. 16, 2022

(87) PCT Pub. No.: WO2022/014130

PCT Pub. Date: Jan. 20, 2022

(65) Prior Publication Data

US 2023/0312355 A1     Oct. 5, 2023

(30) Foreign Application Priority Data

Jul. 17, 2020     (JP) ................................. 2020-123143

(51) Int. Cl.
*C01B 33/18*              (2006.01)
(52) U.S. Cl.
CPC .......... *C01B 33/18* (2013.01); *C01P 2004/34* (2013.01); *C01P 2004/61* (2013.01); *C01P 2004/62* (2013.01)
(58) Field of Classification Search
CPC .. C01B 33/18; C01P 2004/34; C01P 2004/61; C01P 2004/62

(Continued)

(56) References Cited

U.S. PATENT DOCUMENTS

| | | | | |
|---|---|---|---|---|
| 5,024,826 A | * | 6/1991 | Linton | ................... B82Y 30/00 |
| | | | | 423/335 |
| 11,608,273 B2 | * | 3/2023 | Kamiya | ................... B01J 13/08 |

(Continued)

FOREIGN PATENT DOCUMENTS

| | | | | |
|---|---|---|---|---|
| CA | 2618552 A1 | * | 2/2007 | ............. C01B 33/18 |
| CN | 102471590 A | | 5/2012 | |

(Continued)

OTHER PUBLICATIONS

International Search Report of PCT/JP2021/017889 mailed on Jul. 20, 2021.

(Continued)

*Primary Examiner* — Christina A Johnson
(74) *Attorney, Agent, or Firm* — IP Business Solutions, LLC

(57)                    ABSTRACT

Provided is a hollow inorganic particle having excellent strength despite having high porosity. Provided is a hollow inorganic particle including an outer shell, the thinnest part of the outer shell/the thickest part of the outer shell being 0.80 or more. The hollow inorganic particle according to the present technology can be produced by a production method including: a coating step of coating core particles made of an organic polymer with a silicone-based compound; and a core particle removal step of removing the core particles. The coating step includes: a dispersant addition step of adding a dispersant to a core particle dispersion; and, after the dispersant addition step, a surfactant addition step of adding a cationic surfactant.

3 Claims, 5 Drawing Sheets

(58) Field of Classification Search
USPC ......................................................... 423/335
See application file for complete search history.

(56)                        References Cited

U.S. PATENT DOCUMENTS

| | | | |
|---|---|---|---|
| 2005/0244322 A1* | 11/2005 | Chen ....................... | C01B 39/00 |
| | | | 423/335 |
| 2012/0123021 A1 | 5/2012 | Yano et al. | |
| 2012/0264599 A1 | 10/2012 | Komatsu et al. | |
| 2020/0283300 A1 | 9/2020 | Kamiya et al. | |

FOREIGN PATENT DOCUMENTS

| | | |
|---|---|---|
| JP | H06-142491 A | 5/1994 |
| JP | 2011-126761 A | 6/2011 |
| JP | 2011-132087 A | 7/2011 |
| JP | 2011-225756 A | 11/2011 |
| JP | 2012-136363 A | 7/2012 |
| JP | 2014-055083 A | 3/2014 |
| JP | 2014-162920 A | 9/2014 |
| KR | 10-2016-0127871 A | 11/2016 |
| WO | 2019/131658 A1 | 7/2019 |

OTHER PUBLICATIONS

Written Opinion of the International Searching Authority of PCT/JP2021/017889 mailed on Jul. 20, 2021.
Lijuan Zhang et al., "Hollow Silica Spheres: Synthesis and Mechanical Properties", American Chemical Society, Published on Jan. 27, 2009, vol. 25, No. 5, p. 2711-2717.

* cited by examiner

[Fig. 1]
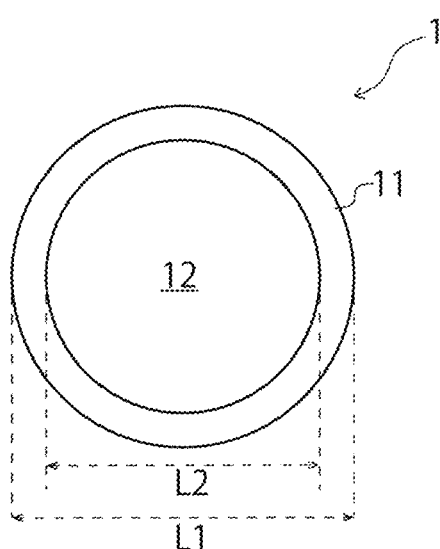

[Fig. 2]
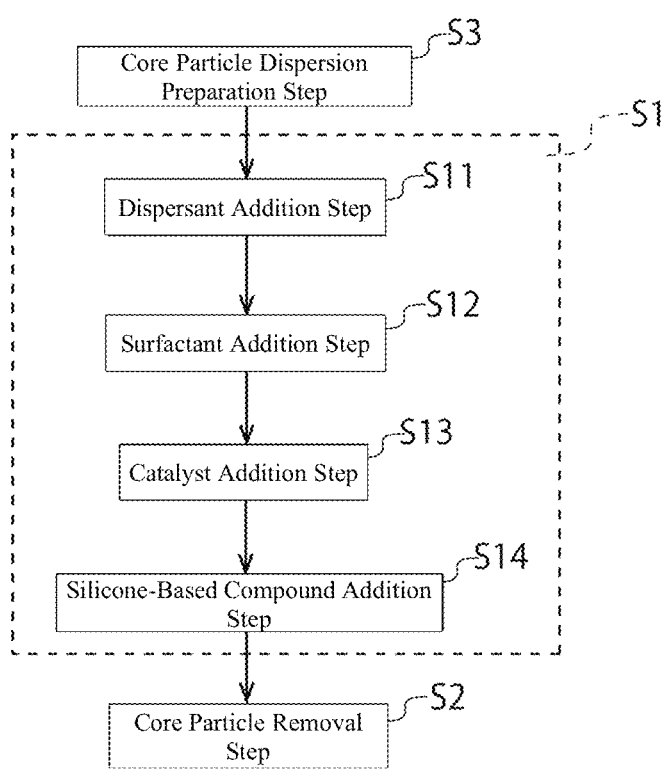

[Fig. 3]
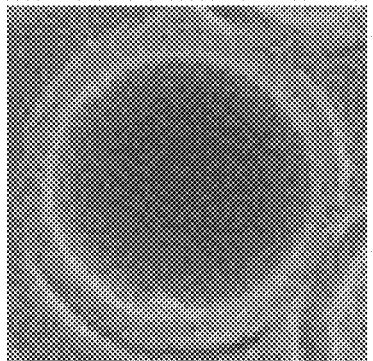
[Fig. 4]
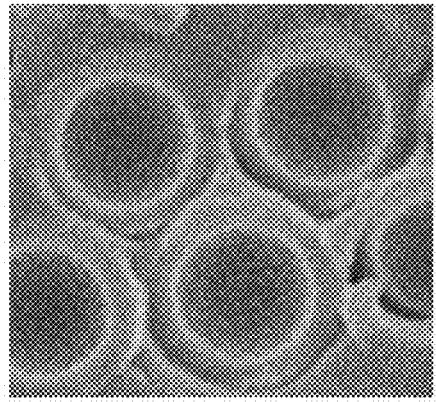

[Fig. 5]
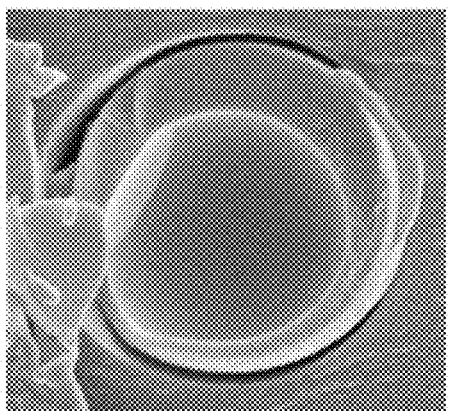
[Fig. 6]
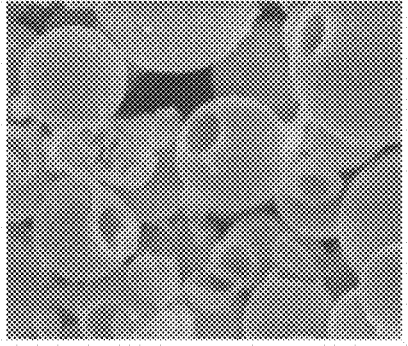

[Fig. 7]
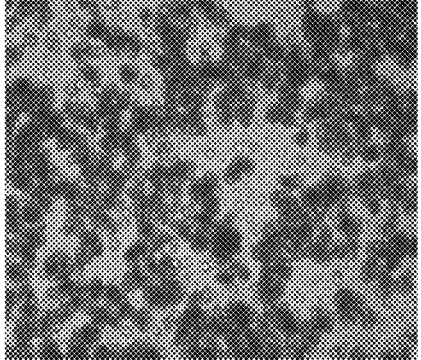

HOLLOW INORGANIC PARTICLE AND METHOD FOR PRODUCING SAID HOLLOW INORGANIC PARTICLE

TECHNICAL FIELD

The present invention relates to a hollow inorganic particle and also to a method for producing the hollow inorganic particles.

BACKGROUND ART

Hollow inorganic particles have been used in a wide range of fields, including fillers, spacers, ceramic raw materials, resin modifiers, adsorbents, electronic materials, semiconductor materials, paints, cosmetics, and the like. In recent years, various technologies are being developed for the purpose of improving the performance of hollow inorganic particles, imparting properties for various applications, etc.

For example, Patent Literature 1 describes a technology in which a coating step of forming a polyorganosiloxane film on polymer particles containing a polyorganosiloxane polymer, thereby obtaining coated polymer particles, and a calcination step of calcining the coated polymer particles are performed, whereby hollow inorganic particles having inorganic particles present in the hollow part are produced.

Patent Literature 2 describes a technology in which an organic resin particle component is removed from composite particles characterized by having a spherical shape or such a shape that small projections of polyorganosiloxane are chemically bonded to the surface of the spherical particles, in which the amount of polyorganosiloxane blended per part by weight of organic resin particles is 1 to 50 parts by weight, whereby hollow polyorganosiloxane particles characterized in that the average particle outer diameter is 1 to 15 μm, and the particle interior is hollow, are produced.

Patent Literature 3 describes a technology in which spherical polymer-metal compound composite particles characterized in that the core is made of a polymer, while the shell is made of a metal compound selected from a titanium compound and/or a silicon compound, are heated, whereby spherical metal compound hollow particles having holes in the particle interior are produced.

CITATION LIST

Patent Literature

Patent Literature 1: JP-A-2011-132087
Patent Literature 2: JP-A-2014-162920
Patent Literature 3: JP-A-H06-142491

SUMMARY OF INVENTION

Technical Problem

As described above, various technologies are being developed for the purpose of improving the performance of hollow inorganic particles, imparting properties for various applications, etc. For example, for the purpose of lowering the dielectric constant, lowering the refractive index, etc., a technique in which hollow inorganic particles are kneaded into a resin, ceramic, or like material to create an air layer inside the material has been utilized. At this time, in order to uniformly disperse the hollow inorganic particles in other materials, a force such as stir-mixing is applied when such a material and the hollow inorganic particles are kneaded.

However, there is a problem in that the hollow inorganic particles crack due to the force, making it impossible to create an air layer inside the material.

Meanwhile, when the outer shell is made thicker in order to improve the strength of the hollow inorganic particles, the porosity becomes lower, causing a problem in that the original effect, that is, creation of an air layer inside the material, cannot be exerted.

Then, a main object of the present technology is to provide a hollow inorganic particle having excellent strength despite having high porosity.

Solution to Problem

That is, the present technology first provides a hollow inorganic particle including an outer shell, the thinnest part of the outer shell/the thickest part of the outer shell being 0.80 or more.

The hollow inorganic particle according to the present technology can be configured such that the hollow inorganic particles have an average particle outer diameter of 0.05 to 5 μm.

The hollow inorganic particle according to the present technology can be configured such that the particle inner diameter/the particle outer diameter is 0.55 to 0.93.

The hollow inorganic particle according to the present technology can be configured such that the outer shell is composed of silica or organopolysiloxane.

The hollow inorganic particle according to the present technology can be configured to have a water absorption of less than 2%.

The hollow inorganic particle according to the present technology can be configured such that the hollow inorganic particles include hollow inorganic particles A having an average particle outer diameter of 0.1 to 5 μm in a proportion of less than 80 wt % of the total, and hollow inorganic particles B having an average particle outer diameter smaller than that of the hollow inorganic particles A in a proportion of more than 20 wt % of the total.

The present technology next provides a method for producing hollow inorganic particles, including:
  a coating step of coating core particles made of an organic polymer with a silicone-based compound; and
  a core particle removal step of removing the core particles,
  the coating step including:
  a dispersant addition step of adding a dispersant to a core particle dispersion; and,
  after the dispersant addition step, a surfactant addition step of adding a cationic surfactant.

The production method according to the present technology can be configured such that in the coating step, the core particle dispersion after the surfactant addition step has a cationic surfactant concentration of 0.05 to 5 g/L.

As the dispersant used in the production method according to the present technology, a hydrophilic polymer can be used.

Further, according to the present technology, a low dielectric material using the hollow inorganic particle can be provided.

Advantageous Effects of Invention

According to the present invention, a hollow inorganic particle having excellent strength despite having high porosity can be provided.

Incidentally, the effects are not necessarily limited to those described here, and may be any of the effects described herein.

BRIEF DESCRIPTION OF DRAWINGS

FIG. 1 is a cross-sectional image diagram showing an example of the cross-sectional structure of a hollow inorganic particle 1 according to the present technology.

FIG. 2 is a flowchart of a method for producing hollow inorganic particles 1 according to the present technology.

FIG. 3 is a cross-sectional micrograph of hollow inorganic particles according to Example 1.

FIG. 4 is a cross-sectional micrograph of hollow inorganic particles according to Example 2.

FIG. 5 is a cross-sectional micrograph of hollow inorganic particles according to Comparative Example 1.

FIG. 6 is a micrograph of hollow inorganic particles according to Comparative Example 2.

FIG. 7 is a micrograph at the time of adding a cationic surfactant to a core particle dispersion in Comparative Example 3.

DESCRIPTION OF EMBODIMENTS

Hereinafter, preferred modes for carrying out the present invention will be described in detail with reference to the drawings.

Incidentally, the embodiments described below show some examples of typical embodiments of the present invention, and do not narrow the interpretation of the scope of the present invention.

<1. Hollow Inorganic Particle 1>

FIG. 1 is a cross-sectional image diagram showing an example of the cross-sectional structure of a hollow inorganic particle 1 according to the present technology. The hollow inorganic particle 1 according to the present invention includes an outer shell 11 and a hollow 12, and is characterized in that the hollow 12 is present approximately in the center of the hollow inorganic particle 1, that is, characterized in that the thickness of the outer shell 11 is approximately uniform. Specifically, the thinnest part of the outer shell 11/the thickest part of the outer shell 11 is 0.80 or more.

The thinnest part of the outer shell 11/the thickest part of the outer shell 11 of the hollow inorganic particle 1 according to the present technology can be suitably designed according to the purpose. Particularly in the present technology, the thinnest part of the outer shell 11/the thickest part of the outer shell 11 of the hollow inorganic particle 1 is preferably 0.80 or more, more preferably 0.85 or more, and still more preferably 0.90 or more.

As a result of setting the thinnest part of the outer shell 11/the thickest part of the outer shell 11 of the hollow inorganic particle 1 according to the present technology at 0.80 or more, the outer shell 11 has approximately uniform thickness and increased strength.

In the past, there has been a technology for making the porosity and the outer shell thickness uniform among particles in a group of hollow particles. However, the present technology is characterized in that in a single particle, the thickness of its outer shell 11 is made uniform.

When the hollow 12 is formed off center, the thickness of the resulting outer shell 11 is non-uniform, causing problems such as the breakage of thin parts of the outer shell 11 and the formation of a hole in the particle. However, in the hollow inorganic particle 1 according to the present technology, the thickness of the outer shell 11 is approximately uniform, and thus the strength is high. Therefore, there is such a characteristic that, for example, even in the case where an external force is applied to the particles due to stirring, roll-milling, or the like during mixing with other materials such as resins, breakage is less likely to occur.

The particle outer diameter L1 of the hollow inorganic particle 1 according to the present technology can be suitably designed according to the purpose. Particularly in the present technology, the average particle outer diameter L1 of the hollow inorganic particles 1 is preferably 0.05 to 5 µm, more preferably 0.1 to 3 µm, and still more preferably 0.5 to 2 µm.

As a result of setting the particle outer diameter L1 of the hollow inorganic particles 1 according to the present technology at 0.05 µm or more, the proportion of particles dispersed in the form of primary particles without aggregation increases. In addition, as a result of setting the particle outer diameter L1 of the hollow inorganic particles 1 according to the present technology at 5 µm or less, the packing density of the particles during mixing with other materials such as resins can be enhanced, whereby the intended effects, such as a low dielectric constant and a low refractive index, can be fully exerted.

In addition, the particle inner diameter L2 and particle outer diameter L1 of the hollow inorganic particle 1 according to the present technology can be suitably designed according to the purpose. Particularly in the present technology, the lower limit of the particle inner diameter L2/the particle outer diameter L1 is preferably 0.55 or more, more preferably 0.58 or more, and still more preferably 0.63 or more. In addition, particularly in the present technology, the upper limit of the particle inner diameter L2/the particle outer diameter L1 is preferably 0.93 or less, more preferably 0.91 or less, still more preferably 0.89 or less, and yet more preferably 0.85 or less.

As a result of setting the particle inner diameter L2/the particle outer diameter L1 of the hollow inorganic particles 1 according to the present technology at 0.55 or more, a sufficient air layer can be created in the material to be kneaded, and, as a result, the intended effects, such as a low dielectric constant and a low refractive index, can be fully exerted. In addition, as a result of setting the particle inner diameter L2/the particle outer diameter L1 of the hollow inorganic particles 1 according to the present technology at 0.93 or less, a decrease in the outer shell thickness can be prevented, and the strength of the particles can be improved.

The CV value (coefficient of variation of particle size distribution) of the hollow inorganic particles 1 according to the present technology is not particularly limited within a range not impairing the effects of the present technology. Particularly in the present technology, the CV value of the hollow inorganic particles 1 is preferably 20% or less, more preferably 15% or less, and still more preferably 10% or less.

When the CV value of the hollow inorganic particles 1 according to the present technology is 20% or less, the proportion of particles larger than the average particle outer diameter decreases, and such a material is suitable for applications where the inclusion of coarse particles is undesirable.

Incidentally, in the present technology, the CV value is a value calculated by the following formula.

$$\text{CV value (\%)} = \{[\text{standard deviation of particle outer diameter (µm)}]/[\text{average particle outer diameter (µm)}]\} \times 100$$

The sphericity of the hollow inorganic particle 1 according to the present technology is not particularly limited within a range not impairing the effects of the present technology. Particularly in the present technology, the sphericity of the hollow inorganic particles 1 is preferably 0.8 or more, and more preferably 0.9 or more.

When the sphericity of the hollow inorganic particles 1 according to the present technology is 0.8 or more, the fluidity of the particles during mixing with other materials such as resins increases, and an increase in viscosity can be suppressed.

Incidentally, in the present technology, the sphericity is a value calculated by the following formula.

$$\text{Sphericity} = \frac{[\text{minor axis of particle outer diameter}]}{[\text{major axis of particle outer diameter}]}$$

The water absorption of the hollow inorganic particle 1 according to the present technology is not particularly limited within a range not impairing the effects of the present technology. Particularly in the present technology, the water absorption of the hollow inorganic particles 1 is preferably less than 2%, more preferably less than 1%, and still more preferably less than 0.5%.

When the water absorption of the hollow inorganic particles 1 according to the present technology is less than 2%, the moisture absorption of water by the hollow inorganic particles 1 can be reduced, and the influence of water on the physical properties of the material to be kneaded can be reduced.

Incidentally, in the present technology, the water absorption is the rate of weight increase when left to stand at 30° C. and 90% RH for 48 hours.

The material forming the outer shell 11 of the hollow inorganic particle 1 according to the present technology is not particularly limited, and can be formed from materials that can be used for general hollow inorganic particles. Particularly in the present technology, the outer shell 11 of the hollow inorganic particle 1 is preferably made of silica or organopolysiloxane, more preferably of organopolysiloxane. At the time of combustion in the below-described core particle removal step, the organopolysiloxane layer is in a porous state, from which generated gases can easily escape, leading to such an effect that the thick outer shell 11 is less likely to crack. In addition, when a treatment at a higher temperature is subsequently performed, a dense silica outer shell 11 can be formed.

In addition, it is preferable that the outer shell 11 of the hollow inorganic particle 1 according to the present technology is made of a high-purity material containing no impurities. That is, it is preferable that the outer shell 11 of the hollow inorganic particle 1 is made using a material that does not contain metal elements or halogen elements other than the components constituting the hollow inorganic particle 1.

The hollow inorganic particles 1 according to the present technology may be a mixture of two or more kinds of hollow inorganic particles 1 having different average particle sizes. When two or more kinds of particle sizes are present, the packing density of the particles during kneading into a resin, ceramic, or like material can be improved, and the proportion of the air layer can also be improved. As a result, the intended effects, such as a low dielectric constant and a low refractive index, can be fully exerted.

Specifically, for example, it is possible that the proportion of hollow inorganic particles A having an average particle outer diameter of 0.1 to 5 μm is set at less than 80 wt % of the total, and hollow inorganic particles B having an average particle outer diameter smaller than that of the hollow inorganic particles A are present in a proportion of more than 20 wt % of the total.

The hollow inorganic particle 1 according to the present technology may be surface-treated with a resin, a silane coupling agent, or the like for the purpose of improving fluidity and suppressing an increase in viscosity during mixing with other materials such as resins.

The application of the hollow inorganic particle 1 according to the present technology described above is not particularly limited, and use for various applications of general hollow inorganic particles 1 is possible. The hollow inorganic particles 1 according to the present technology are particularly suitable as particles for adjusting the dielectric constant.

<2. Method for Producing Hollow Inorganic Particles 1>

FIG. 2 is a flowchart of a method for producing hollow inorganic particles 1 according to the present technology. The method for producing hollow inorganic particles 1 according to the present technology is a method in which at least a coating step S1 and a core particle removal step S2 are performed. In addition, in the present technology, if necessary, a core particle dispersion preparation step S3 can also be performed. Hereinafter, the steps will each be described in detail in chronological order.

(1) Core Particle Dispersion Preparation Step S3

The core particle dispersion preparation step S3 is a step in which core particles are stir-mixed with water to prepare a core particle dispersion. In the core particle dispersion preparation step S3, if necessary, other additives can also be added.

Core particles that can be used in the present technology are not particularly limited within a range not impairing the effects of the present technology, and core particles that can be used in the production of general hollow inorganic particles can be freely selected and used. For example, particles of organic polymers such as polymethyl methacrylate (PMMA), polymethyl acrylate (PMA), polystyrene (PS), polyethylene (PE), polypropylene (PP), polyurethane (PU), polyimide (PI), polyvinyl chloride (PVC), ethylene vinyl acetate copolymers (EVA), phenol resin (PF), melamine resin (MF), epoxy resin (EP), polyester resin (PEs), and divinylbenzene polymers can be mentioned.

Core particles that can be used in the present technology are preferably spherical. In addition, the average particle outer diameter can be freely designed according to the intended hollow size. Particularly in the present technology, the average particle outer diameter of the core particles is preferably 0.04 to 5.8 μm, more preferably 0.08 to 3.5 μm, and still more preferably 0.4 to 2.4 μm.

As a result of setting the average particle outer diameter of the core particles at 0.04 μm or more, the proportion of particles dispersed in the form of primary particles without aggregation increases. In addition, as a result of setting the average particle outer diameter of the core particle at 5.8 μm or less, the packing density of the particles during mixing with other materials such as resins can be enhanced, whereby the intended effects, such as a low dielectric constant and a low refractive index, can be fully exerted.

In the core particle dispersion, any additives can be used according to the purpose. Additives that can be used in the core particle dispersion are used, for example, for the purpose of dispersing the core particles in a solvent. These additives are not particularly limited within a range not impairing the effects of the present technology, and general additives can be freely selected and used. As additives that can be used in the core particle dispersion, for example, polyvinyl alcohol (PVA), polyvinylpyrrolidone (PVP), hydroxyethyl cellulose (HEC), polyethylene glycol (PEG), sodium dodecyl sulfate (SDS), carboxymethyl cellulose (CMC), polystyrene sulfonate (PSS), polyvinyl sulfate (PVS), polyacrylic acid (PAA), and polymethacrylic acid (PMA) can be mentioned.

In addition, the solvent and additives used in the synthesis of the core particles may be directly used. In particular, for the purpose of stably dispersing the core particles in a solvent, it is desirable that the dispersant and emulsifier used in the synthesis are contained. As methods for synthesizing particles using a solvent and additives, for example, dispersion polymerization, soap-free polymerization, emulsion polymerization, swelling seed polymerization, and membrane emulsification can be mentioned.

In addition, as the core particle dispersion, a commercially available resin particle dispersion can be used. The dispersion medium is not particularly limited within a range not impairing the effects of the present technology, and can be freely selected and used. For example, water, alcohols such as methanol, ketones such as methyl ethyl ketone, glycols such as ethylene glycol, glycol ethers such as 1-methoxy-2-propanol, and the like can be mentioned. Among them, because water is used as a solvent at the time of synthesis in the present technology, it is desirable to select water as the dispersion medium.

(2) Coating Step S1

The coating step S1 is a step in which core particles are coated using a silicone-based compound. In the coating step S1, a dispersant addition step S11, a surfactant addition step S12, a catalyst addition step S13, and a silicone-based compound addition step S14 are performed. Then, the method for producing hollow inorganic particles 1 according to the present technology is characterized in that in the coating step S1, the dispersant addition step S11 and the surfactant addition step S12 are performed in this order.

(2-1) Dispersant Addition Step S11

The dispersant addition step S11 is a step in which a dispersant is added to the core particle dispersion prepared in the core particle dispersion preparation step S3.

Dispersants that can be used in the present technology are not particularly limited within a range not impairing the effects of the present technology, and dispersants that can be used in the production of general hollow inorganic particles can be freely selected and used. For example, nonionic surfactants, such as polyvinyl alcohol (PVA), polyvinylpyrrolidone (PVP), hydroxyethyl cellulose (HEC), and polyethylene glycol (PEG), and anionic surfactants, such as sodium dodecyl sulfate (SDS), carboxymethyl cellulose (CMC), polystyrene sulfonate (PSS), polyvinyl sulfate (PVS), polyacrylic acid (PAA), and polymethacrylic acid (PMA), can be mentioned. Among them, particularly in the present technology, nonionic surfactants are preferable, and it is still more preferable to use polyvinyl alcohol (PVA). It is preferable to use a nonionic surfactant because even when used in combination with a cationic surfactant, the aggregation of particles is not promoted. Further, it is more preferable to use polyvinyl alcohol (PVA) because hydrophilic groups contained therein show interaction with silanol groups.

The dispersant concentration in the core particle dispersion after the dispersant addition step S11 is not particularly limited within a range not impairing the effects of the present technology, but is preferably 1 g/L or more. As a result of setting the dispersant concentration in the core particle dispersion within this range, the coalescence of particles can be prevented.

(2-2) Surfactant Addition Step S12

The surfactant addition step S12 is a step in which a cationic surfactant is added to the core particle dispersion after the dispersant addition step S11. In the present technology, as a result of using a cationic surfactant, the hollow 12 exists in the central part of each hollow inorganic particle, and particles with uniform outer shell 11 thickness can be obtained.

In addition, in the present technology, as a result of performing the surfactant addition step S12 after the dispersant addition step S11, the coalescence of particles can be prevented. At the same time, the cationic surfactant concentration on the particle surface can be increased, and the uneven distribution of core particles can be prevented. As a result, the hollow 12 exists in the central part of each hollow inorganic particle, and particles with uniform outer shell 11 thickness can be obtained.

Cationic surfactants that can be used in the present technology are not particularly limited within a range not impairing the effects of the present technology, and cationic surfactants that can be used in the production of general hollow inorganic particles can be freely selected and used. For example, cationic polymeric surfactants, such as polyethylene imine (PEI) and polydiallyldimethyl ammonium chloride (PDDA), and cationic low-molecular-weight surfactants, such as polyvinyl amine, tetramethyl ammonium chloride, and cetyltrimethyl ammonium bromide, can be mentioned. Among them, particularly in the present technology, it is preferable to use polyethylene imine (PEI) or polydiallyldimethyl ammonium chloride (PDDA), which is a cationic polymeric surfactant. As a result of using a cationic polymeric surfactant, adsorption onto the particle surface is more likely to take place, and the effect of preventing the uneven distribution of core particles is enhanced.

The cationic surfactant concentration in the core particle dispersion after the surfactant addition step S12 is not particularly limited within a range not impairing the effects of the present technology, but is preferably 0.05 to 5 g/L. As a result of setting the cationic surfactant concentration in the core particle dispersion within this range, the hollow 12 exists in the central part of each hollow inorganic particle, and particles with uniform outer shell 11 thickness can be obtained.

(2-3) Catalyst Addition Step S13

The catalyst addition step S13 is a step in which a substance that serves as a catalyst in the hydrolytic condensation reaction that proceeds in the below-described silicon-based compound addition step S14 is added to the core particle dispersion.

The order of the catalyst addition step S13 is not particularly limited as long as it is performed before or simultaneously with the below-described hydrolytic condensation reaction of a silicone-based compound. That is, it may be performed before, after, or simultaneously with the addition step S11, before, after, or simultaneously with the surfactant addition step S12, or before or simultaneously with the below-described silicon-based compound addition step S14.

Catalysts that can be used in the present technology are not particularly limited within a range not impairing the effects of the present technology, and catalysts that can be used in the production of general hollow inorganic particles can be freely selected and used. For example, at least either of ammonia and an amine can be mentioned. As amines, for example, monomethyl amine, dimethyl amine, monoethyl amine, and the like can be mentioned. Among them, particularly in the present technology, it is preferable to use ammonia because it is less toxic, easier to remove from the particles, and less expensive.

The amount of catalyst added in the catalyst addition step S13 is not particularly limited within a range not impairing the effects of the present technology, and can be freely set according to the purpose.

(2-4) Silicone-Based Compound Addition Step S14

The silicone-based compound addition step S14 is a step in which a silicone-based compound is added to the core particle dispersion after the dispersant addition step S11 and the surfactant addition step S12. In the silicone-based compound addition step S14, the hydrolytic condensation reaction of the silicone-based compound proceeds on the surface of the core particles, whereby the surface of the core particles is coated with the silicone-based compound.

Silicone-based compounds that can be used in the present technology are not particularly limited within a range not impairing the effects of the present technology, and silicone-based compounds that can be used in the production of general hollow inorganic particles can be freely selected and used. For example, methyltrimethoxysilane (MTMS), methyltriethoxysilane, ethyltrimethoxysilane, propyltrimethoxysilane, ethyltriethoxysilane, phenyltrimethoxysilane, phenyltriethoxysilane, vinyltrimethoxysilane, vinyltriethoxysilane, γ-glycidoxypropyltrimethoxysilane, γ-acryloyloxypropyltrimethoxysilane, γ-methacryloyloxypropyltrimethoxysilane, γ-mercaptopropyltrimethoxysilane, γ-aminopropyltrimethoxysilane, dimethyldimethoxysilane, and the like can be mentioned. As a result of using a trifunctional silicone-based compound, because three alkoxyl groups that form a three-dimensional skeleton and one organic group that induces intermolecular interaction are contained, the outer shell 11 thickness of the hollow inorganic particles 1 can be uniformly increased, allowing for the exertion of such effects that, for example, when the hollow inorganic particles 1 are mixed with other materials such as resins, even in the case where an external force is applied to the particles due to stirring, roll-milling, or the like, breakage is less likely to occur. Among them, particularly in the present technology, it is preferable to use methyltrimethoxysilane (MTMS), which is inexpensive and readily available.

The amount of silicone-based compound added in the silicone-based compound addition step S14 is not particularly limited within a range not impairing the effects of the present technology, and can be set according to the purpose of the adjustment of the outer shells 11 of the hollow inorganic particles 1 to the desired thickness.

In the silicone-based compound addition step S14, a silicone compound is added in the form of an aqueous solution to the core particle dispersion. The method for preparing the aqueous silicone-based compound solution is not particularly limited within a range not impairing the effects of the present technology, and preparation using a general method for preparing an aqueous solution is possible. For example, it is possible that the silicone-based compound and water are stir-mixed to prepare an aqueous solution of a silicone liquid.

In the silicone-based compound addition step S14, according to the purpose, any additives can be separately added simultaneously with the addition of the aqueous silicone-based compound solution. As additives that can be used, for example, dispersants added in the dispersant addition step S11, such as polyvinyl alcohol (PVA) and polyvinylpyrrolidone, cationic surfactants added in the surfactant addition step S12, such as polyethylene imine (PEI) and polydiallyldimethyl ammonium chloride (PDDA), and catalysts added in the catalyst addition step S13, such as ammonia and amines, can be mentioned. These additives can also be previously added to the aqueous silicone-based compound solution and then used in the silicone-based compound addition step S14.

The method for adding the aqueous silicone-based compound solution to the core particle dispersion is not particularly limited within a range not impairing the effects of the present technology, and addition methods that can be used in the production of general hollow inorganic particles can be freely selected and used. Particularly in the present technology, it is preferable to use a dripping method. As a result of using a dripping method, particles that have a small CV value (coefficient of variation of particle size distribution) and are uniform in particle size can be obtained. In addition, as a result of using a dripping method, hollow inorganic particles 1 that are uniform also in terms of the outer shell 11 thickness (there is no difference in the outer shell 11 thickness among particles) can be obtained, allowing for the exertion of such effects that, for example, when the hollow inorganic particles 1 are mixed with other materials such as resins, even in the case where an external force is applied to the particles due to stirring, roll-milling, or the like, breakage is less likely to occur. Further, as a result of using a dripping method, the particles can be prevented from adhering and sticking to each other. Thus, the particles are not fractured during particle deagglomeration and resin kneading, and, in addition, aggregation after resin kneading can also be prevented.

Incidentally, in the case of producing hollow inorganic particles 1 having thin outer shells 11, even when the solution is added at once without using a dripping method, hollow inorganic particles 1 with uniform outer shell 11 thickness can be obtained.

The dripping speed of the aqueous silicone-based compound solution in the silicone-based compound addition step S14 can also be freely set within a range not impairing the effects of the present technology. Particularly in the present technology, in order to prevent the denaturation of the aqueous silicone-based compound solution, it is preferable to set the dripping speed such that the addition time of the aqueous silicone-based compound solution is within 24 hours.

(3) Core Particle Removal Step S2

This is a step in which the core particles are removed after the coating step S1 is performed. As a result of performing the coating step S1, the core particles are in a state of being coated with the silicone-based compound. Thus, as a result of removing the core particles in this state, only outer shells 11 composed of the silicone-based compound are left, whereby hollow inorganic particles 1 can be produced.

The method for removing core particles performed in the core particle removal step S2 is not particularly limited within a range not impairing the effects of the present technology, and removal methods that can be used in the production of general hollow inorganic particles can be freely selected and used. For example, in the case of using core particles with low solvent resistance, a method for removing core particles using an organic solvent can be selected, while in the case of using core particles that can be removed by heating, a method for removing core particles by heating or calcination can be selected. Particularly in the present technology, it is preferable to remove the core particles by calcination. As a result of performing calcination, removal of the core particles and densification of the outer shell 11 layer can be performed at the same time.

The calcination conditions in the case of removing the core particles by calcination can be freely set according to the material of the core particles, etc., within a range not impairing the effects of the present technology. For example, the calcination temperature is preferably set within a range of 150 to 1,200° C., and more preferably set within a range of either 150 to 400° C. or 700 to 1,200° C. As a result of setting the calcination temperature at 150° C. or higher, the core particles can be sufficiently removed. In addition, as a result of setting the calcination temperature at 1,200° C. or less, the occurrence of aggregation due to sintering can be prevented. Further, as a result of setting the calcination temperature within a range of either 150 to 400° C. or 700 to 1,200° C., the obtained hollow inorganic particles can be provided with a water absorption of less than 2%.

Here, in the case where the calcination temperature is 150 to 400° C., the outer shell is organopolysiloxane, which is hydrophobic, and thus the water absorption is low. In addition, at a calcination temperature of 700 to 1,200° C., the outer shell is silica, and the number of OH groups is reduced due to high-temperature calcination, resulting in reduced adsorption of water, so the water absorption is low. In the case where the calcination temperature is 150 to 400° C., the organopolysiloxane outer shell can be expected to have effects such as lowering the dielectric constant, lowering the hardness of the particles, and improving the compatibility with the resin to be kneaded. Meanwhile, at a calcination temperature of 700 to 1,200° C., the silica outer shell can be expected to have the properties of general silica fillers, such as suppressing the coefficient of linear expansion.

In addition, the atmosphere in the calcination furnace may be air, or may also be an inert atmosphere having the oxygen concentration adjusted with an inert gas such as nitrogen or argon. As a result of calcination in an inert atmosphere, the core particles are thermally decomposed (endothermic reaction), and thus heat generation can be suppressed. Therefore, even when a large amount of particles are calcined, the outer shell 11 layer can be prevented from cracking, and, in addition, the temperature can be easily controlled.

In the case of calcination in an inert atmosphere, it is more preferable that the calcination temperature is set within the range of 150 to 1,200° C. As a result of calcination within this temperature range, the hardness of the hollow inorganic particles 1 can be easily controlled, the water absorption can be made less than 2%, and the productivity can also be improved.

Incidentally, it is also possible to combine calcination in air with calcination in an inert atmosphere. For example, it is possible that calcination is performed in an inert atmosphere, and then calcination in air is further performed. As a result of calcination in air, organic components contained in the particles can be removed.

EXAMPLES

Hereinafter, the present invention will be described in further detail based on the Examples.

Incidentally, the examples described hereinafter show some of typical examples of the present invention, and do not narrow the interpretation of the scope of the present invention.

Experiment Example 1

In Experiment Example 1, differences in strength and water absorption due to differences in the form of hollow inorganic particles were examined.

1. Production of Hollow Inorganic Particles

Using a general method for producing hollow inorganic particles, hollow inorganic particles with different forms shown in Table 1 below were produced. Specifically, polymethyl methacrylate (PMMA) particles were used as an example of core particles, and the PMMA particles were coated using methyltrimethoxysilane (MTMS) as an example of a silicone compound to obtain polymethylsilsesquioxane (PMSO)-coated resin particles. The obtained PMSO-coated resin particles were heated to remove the core particles, thereby producing hollow inorganic particles.

Incidentally, the particle size and the outer shell thickness were measured using the following methods.

(1) Particle Size

Core particles, PMSO-coated resin particles, and hollow inorganic particles were each sampled and observed under FE-SEM (JSM-6700F, JEOL Ltd.) to measure the particle sizes of 70 particles, and the average particle size, CV value, and sphericity were calculated.

(2) Outer Shell Thickness

The hollow inorganic particles were embedded in an embedding resin and hardened. Subsequently, the resin was cut with a microtome, and the particle cross-sections were observed under FE-SEM (JSM-6700F, JEOL Ltd.) to measure the particle outer diameter, the particle inner diameter, the thinnest part of the outer shell (Min), and the thickest part of the outer shell (Max). From the measurement results, "the thinnest part of the outer shell (outer shell thickness Min)/the thickest part of the outer shell (outer shell thickness Max)" and "the particle inner diameter/the particle outer diameter" of 10 particles were calculated, and the averages of "the outer shell thickness Min/the outer shell thickness Max" and "the particle inner diameter/the particle outer diameter" of 8 particles excluding the maximum and minimum values were calculated.

2. Evaluation (1) Water Absorption 15 g of hollow inorganic particles dried at 150° C. were allowed to stand in a constant temperature and humidity chamber at 30° C. and 90% RH for 48 hours, and water absorption was determined from the weight changes before and after that.

(2) Cracking Test

A mixture containing hollow inorganic particles in a proportion of 10 wt % relative to an epoxy resin (jER828, manufactured by Mitsubishi Chemical Corporation) was prepared and kneaded with a spatula. Next, the kneaded mixture was subjected to a roll mill with a gap adjusted to 0.08 mm (desktop roll mill, manufactured by Kodaira Seisakusho) repeatedly three times, thereby preparing a cracking test sample. After eluting the epoxy resin component with acetone, the cracking test sample was subjected to solid-liquid separation by centrifugation. This operation was repeated, thereby taking out only the particles that had undergone the cracking test. The particles after the cracking test were observed under FE-SEM (JSM-6700F, JEOL Ltd.) to confirm 3,000 particles, and the proportion of particles confirmed to be cracked was evaluated. A rating of "A" was given when the proportion of cracked particles was less than 1%, "B" was given to 1% or more and less than 5%, "C" was given to 5% or more and less than 10%, and "F was given to 10% or more.

3. Results

The results are shown in Table 1 below.

TABLE 1

| | | Example | | | | | | Comparative Example |
|---|---|---|---|---|---|---|---|---|
| | | 1 | 2 | 3 | 4 | 5 | 6 | 1 |
| Form | Average Particle Size [μm] | 0.86 | 0.48 | 0.067 | 4.60 | 0.89 | 0.99 | 0.69 |
| | CV Value [%] | 2.8 | 2.4 | 13.5 | 1.7 | 2.5 | 2.7 | 2.7 |
| | Outer Shell Thickness Min/Thickness Max | 0.92 | 0.91 | 0.87 | 0.90 | 0.88 | 0.92 | 0.40 |
| | Particle Inner Diameter/Particle Outer Diameter | 0.83 | 0.72 | 0.91 | 0.63 | 0.80 | 0.95 | 0.78 |
| | Sphericity | 0.97 | 0.97 | 0.92 | 0.98 | 0.97 | 0.96 | 0.93 |
| Evaluation | Water Absorption % | 0.3 | 0.4 | 0.2 | 0.1 | 0.8 | 0.5 | 0.5 |
| | Cracking Test | B | A | B | A | B | C | F |

As shown in Table 1, in the hollow inorganic particles of Comparative Example 1, where the thinnest part of the outer shell/the thickest part of the outer shell was less than 0.80, as a result of the cracking test, the proportion of particles confirmed to be cracked was 10% or more. FIG. 5 shows a cross-sectional micrograph of the hollow inorganic particles of Comparative Example 1. Meanwhile, in the hollow inorganic particles of Examples 1 to 6, where the thinnest part of the outer shell/the thickest part of the outer shell was 0.80 or more, as a result of the cracking test, the proportion of particles confirmed to be cracked was less than 10%. FIG. 3 shows a cross-sectional micrograph of the hollow inorganic particles of Example 1, and FIG. 4 shows a cross-sectional micrograph for the hollow inorganic particles of Example 2.

As a result of comparison among the examples, as compared with Example 6 where the particle inner diameter/the particle outer diameter was 0.95, the cracking test results were better in Examples 1 to 5 where the ratio was less than 0.93. This result indicates that it is preferable that the particle inner diameter/the particle outer diameter is 0.93 or less.

In addition, although not confirmed in the Examples, when the particle inner diameter/the particle outer diameter is less than 0.55, that is, the outer shell thickness increases, the strength presumably increases, but the air layer becomes smaller. Therefore, when a low dielectric constant, a low refractive index, and the like are intended, presumably, it is desirable that the particle inner diameter/the particle outer diameter is 0.55 or more.

Experiment Example 2

In Experiment Example 2, it was examined how differences in the method for producing hollow inorganic particles would affect the produced hollow inorganic particles.

1. Production of Hollow Inorganic Particles

Examples 7 and 8

(1) Preparation of Core Particle Dispersion

As an example of core particles, polymethyl methacrylate (PMMA) particles having the average particle diameter and CV value shown in Table 2 were stir-mixed with water to obtain a core particle dispersion having the concentration shown in Table 2.

(2) Preparation of Aqueous Silicone-Based Compound Solution

Methyltrimethoxysilane (MTMS) as an example of a silicone-based compound in the amount shown in Table 2 and water in the amount shown in Table 2 were stirred at 40° C. for 1 hour, and the resulting solution was used to prepare a solution for polymethylsilsesquioxane (PMSO) coating.

(3) Addition of Dispersant

Water in the amount shown in Table 2 and a 5% aqueous PVA solution as an example of a dispersant in the amount shown in Table 2 were added to a core particle dispersion in the amount shown in Table 2, and the mixture was stirred at 30° C. for 10 minutes.

(4) Addition of Surfactant and Catalyst

To the core particle dispersion having added thereto PVA, a 20% aqueous polydiallyldimethyl ammonium chloride (PDDA) solution or a 20% aqueous polyethylene imine (PEI) solution as an example of a cationic surfactant in the amount shown in Table 2 and 1 N aqueous ammonia as an example of a catalyst in the amount shown in Table 2 were added.

(5) Addition of Silicone-Based Compound and Coating with Silicone-Based Compound To the core particle dispersion having added thereto the dispersant, surfactant, and catalyst, the solution for PMSO coating prepared above was dripped over the time shown in Table 2. As a result, the core particles were coated with PMSO. After the elapse of the time shown in Table 2 from the completion of dripping, 1 N aqueous ammonia in the amount shown in Table 2 was added to solidify PMSO, thereby giving PMSO-coated resin particles. The obtained PMSO-coated resin particles were subjected to solid-liquid separation by centrifugation and washed with methanol three times. The washed PMSO-coated resin particles were dried naturally over 2 days, and further dried by heating at 110° C.

(6) Removal of Core Particles

The PMSO-coated resin particles dried above were heated in an electric furnace under the atmosphere shown in Table 2 at the temperature shown in Table 2 for 6 hours to remove the core particles in the PMSO-coated resin particles, thereby giving hollow inorganic particles.

Comparative Example 2

PMSO-coated particles were obtained in the same manner as in Example 1, except that no cationic surfactant was used. The obtained PMSO-coated particles were calcined under the same conditions as in Example 7 to remove the core particles. As a result, the particles had exposed voids and did not become hollow particles (see FIG. 6).

Comparative Example 3

An attempt was made to obtain PMSO-coated particles in the same manner as in Example 7, except that the order of adding a dispersant and a cationic surfactant was reversed. However, aggregation of the particles occurred at the time of adding the cationic surfactant (see FIG. 7), and it was not possible to obtain monodisperse particles.

2. Evaluation (1) Measurement of Particle Size

The particle sizes of 70 particles were measured using the same method as in Experiment Example 1, and the average particle size, CV value, and sphericity were calculated.

(2) Measurement of Outer Shell Thickness

Using the same method as Experiment Example 1, "the outer shell thickness Min/the outer shell thickness Max" and "the particle inner diameter/the particle outer diameter" were calculated.

(3) Water Absorption

Water absorption was determined using the same method as in Experiment Example 1.

(4) Cracking Test

A cracking test was performed using the same method as in Experiment Example 1.

3. Results

The results are shown in Table 2 below.

TABLE 2

|  | Example | | Comparative Example | |
| --- | --- | --- | --- | --- |
|  | 7 | 8 | 2 | 3 |
| Core Particle Dispersion | | | | |
| Material of Core Particles | PMMA | PMMA | PMMA | PMMA |
| Particle Size of Core Particles [μm] | 0.90 | 0.45 | 0.90 | 0.90 |
| CV Value of Core Particles [%] | 1.6 | 2 | 1.6 | 1.6 |
| Concentration of Core Particle Dispersion [wt %] | 9 | 9 | 9 | 9 |
| Coating Step | | | | |
| Amount of Core Particle Dispersion [g] | 282 | 64 | 282 | 282 |
| Water [g] | 282 | 64 | 282 | 282 |
| Dispersant | | | | |
| Kind | 5% PVA | | | |
| Amount Used [g] | 18 | 15 | 18 | 18 |
| Dispersant Concentration in Core Particle Dispersion (g/L) | 6.14 | 20.83 | 6.19 | 6.14 |
| Cationic Surfactant | | | | |
| Kind | 20% PDDA | 20% PEI | — | 20% PDDA |
| Amount Used [g] | 4 | 1.0 | 0 | 4 |
| Surfactant Concentration in Core Particle Dispersion (g/L) | 0.341 | 0.347 | 0.000 | 0.341 |
| Catalyst | | | | |
| Amount of 1N Aqueous Ammonia Used [g] | 3.6 | 1.5 | 3.6 | 3.6 |
| Aqueous Silicone-Based Compound Solution | | | | |
| Kind of Silicone-Based Compound | MTMS | | | |
| Amount Used [g] | 50 | 27 | 50 | 50 |
| Water [g] | 50 | 27 | 50 | 50 |
| Hydrolysis Conditions | Stirring 40° C. 1 h | | | |
| Addition Method | Dripping 3 h | Dripping 5 h | Dripping 3 h | Dripping 3 h |
| 1N Aqueous Ammonia for Solidification [g] | 30 | 15 | 30 | 30 |
| Particles after Coating Step | | | | |
| Particle Size [μm] | 1.09 | 0.62 | Not | Not |
| CV Value [%] | 2.5 | 1.8 | Performed | Performed |
| Core Particle Removal Step | | | | |
| Atmosphere | Air | Nitrogen | Air | Not |
| Temperature [° C.] | 900 | 1000 | 900 | Performed |
| Retention Time [h] | 6 | 6 | 6 | |
| Hollow Inorganic Particles after Calcination | | | | |
| Average Particle Size [μm] | 0.86 | 0.48 | Not | Not |
| CV Value [%] | 2.8 | 2.4 | Performed | Performed |
| Outer Shell Thickness Min/Thickness Max | 0.92 | 0.91 | | |
| Particle Inner Diameter/Particle Outer Diameter | 0.83 | 0.72 | | |
| Sphericity | 0.97 | 0.97 | | |
| Water Absorption % | 0.3 | 0.4 | | |
| Cracking Test | B | A | | |

4. Discussion

As shown in Table 2, in the hollow inorganic particles of Examples 7 and 8, where a cationic surfactant was added after the addition of a dispersant in the coating step, the average particle outer diameter was 0.05 to 5 μm, the thinnest part of the outer shell/the thickest part of the outer shell was 0.80 or more, the particle inner diameter/the particle outer diameter was 0.55 to 0.93, the water absorption was less than 2%, and the cracking test results were excellent.

Meanwhile, as described above, in Comparative Example 2 where no cationic surfactant was used, the resulting particles had exposed voids, and it was not possible to obtain hollow particles (see FIG. 6). In addition, in Comparative Example 3, where the order of adding a dispersant and a cationic surfactant was reversed, aggregation of the PMMA particles occurred at the time of adding the cationic surfactant (see FIG. 7), and it was not possible to obtain monodisperse particles.

REFERENCE SIGNS LIST

1: Hollow inorganic particle
11: Outer shell
12: Hollow

The invention claimed is:

1. A method for producing hollow inorganic particles, comprising:
   a coating step of coating core particles made of an organic polymer with a silicon-based compound; and
   a core particle removal step of removing the core particles,
   the coating step including:
   a dispersant addition step of adding a nonionic surfactant as dispersant to a core particle dispersion; and,
   after the dispersant addition step, a surfactant addition step of adding a cationic polymeric surfactant,
      whereby the hollow inorganic particles thus produced have an average particle inner diameter/particle outer diameter of 0.55 to 0.93.

2. The method for producing hollow inorganic particle according to claim 1, wherein in the coating step, the core particle dispersion after the surfactant addition step has a cationic polymeric surfactant concentration of 0.05 to 5 g/L.

3. The method for producing hollow inorganic particle according to claim 1, wherein the dispersant is a hydrophilic polymer.

* * * * *